J. SUTTER.
MANUFACTURE OF NUTS.
No. 180,285.  Patented July 25, 1876.
Fig. 1.
Fig. 2.
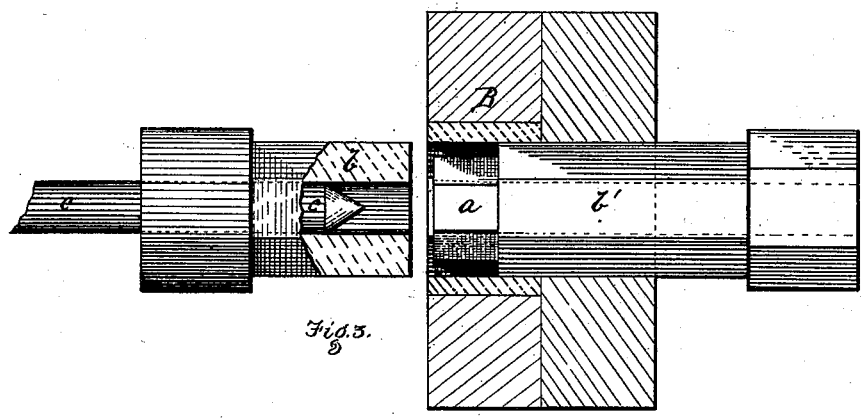
Fig. 3.
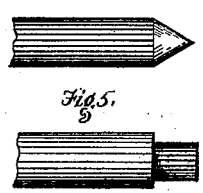
Fig. 5.
Fig. 4.
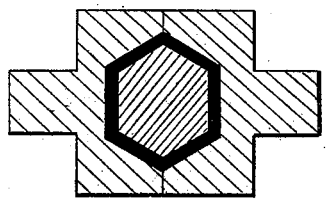
Fig. 6.
Witnesses:
James G. Kay
R. C. Crenshaw
Inventor:
Jacob Sutter
By Bakewell & Kerr
Attys.
N. PETERS, PHOTO-LITHOGRAPHER, WASHINGTON, D. C.

UNITED STATES PATENT OFFICE.

JACOB SUTTER, OF PITTSBURG, PENNSYLVANIA.

IMPROVEMENT IN THE MANUFACTURE OF NUTS.

Specification forming part of Letters Patent No. 180,285, dated July 25, 1876; application filed December 18, 1875.

*To all whom it may concern:*

Be it known that I, JACOB SUTTER, of Pittsburg, in the county of Allegheny and State of Pennsylvania, have invented a new and useful Improvement in Manufacture of Nuts; and I do hereby declare the following to be a full, clear, and exact description thereof, reference being had to the accompanying drawing, forming a part of this specification, in which—

Figure 1 represents a bar or rod from which several nut-blanks have been cut. Fig. 2 is a perspective view of a nut. Fig. 3 is a sectional view of a die-box, dies, and punch, which, or like devices, may be employed in carrying out my invention. Fig. 4 is a transverse section of the die-box and nut before the latter is compressed and punched; Figs. 5 and 6, modified forms of punches.

Like letters refer to like parts wherever they occur.

My invention relates to the manufacture of nuts; and consists in the production of a nut by first forming a bar of iron, the cross-section of which shall be a polygon of the general form of the nut to be produced, but slightly less in area; secondly, dividing said bar transversely into sections corresponding to the nut to be produced; thirdly, inclosing the blank thus formed in a close die-box, fitted with suitable compressing-dies; and, finally, while the blank is supported by the inclosing die-box and dies, punching the nut by means of a punch, which increases in size from the entering end, thus obtaining a nut of perfect form, with little or no loss of material, and without breaking or distorting the fiber in the nut.

In the patent granted to Wm. Charles and Mathew McKain, October 6, 1874, No. 155,638, a blank approximating in form the nut to be produced was formed from a bar by means of swages, and subsequently inclosed within a close die-box and between dies, through one of which passed a punch, increasing in size from the entering end, by which the nut was punched, a portion of the metal of the blank being forced into the body of the nut by the punch.

In working the said invention of Charles and McKain, while it is evident that to obtain the best results, viz., a nut perfect in outline, and having sharp angles, the blank must be made to conform in general outline to the nut to be produced, and unless it does the deficiency cannot be made up by the metal forced into the nut by the punch, for the reason that the punch will displace the metal, forcing it equally in all directions, yet it is also evident that the nut will be stronger and better if the desired outline of the blank is obtained without breaking or distorting the fiber, as is likely to occur when swages are employed to form the blank, or dies to upset the nut after the eye is punched.

With these things in view, I have availed myself of the method of punching embodied in the patent specified, but form the blank previous to the punching, in the manner hereinafter more specifically set forth.

In order to enable others skilled in the art to which it appertains to apply my invention, I will now proceed to more fully describe the same.

I first form a polygonal bar, A, (in the drawing hexagonal,) by means of the rolls or in other suitable manner, which shall in cross-section correspond in form to the nut to be produced, but shall be slightly smaller, difference being to a certain extent dependent on the area of a cross-section of the punch to be employed in punching the blank. Having obtained the bar specified, I cut it into sections $a$, the length of which are dependent on the required size of the nut. These sections or blanks are then fed into a closed die-box, B, which is provided with the usual dies $b\ b'$, through one of which may pass the eye-punch $c$, and the blank $a$, while thus supported, has its eye formed by the punch $c$, which increases in size from the entering end to the full size for the required size of the eye of the nut.

The dies $b\ b'$ may be operated either at the time of, or subsequent to, the punching, to compress and compact the nut.

By this method I obtain a nut without disturbing the natural parallelism of the fibers of the iron. The several steps are such that in forming the bar for the blank the fiber of the iron is drawn, but not torn or distorted; in the punching the eye the fiber is displaced laterally, and causes the blank to fill the die-box; and, finally, the shape of the blank corresponding with the box, and the metal displaced laterally by the punch causing the blank to fill the box, the fiber is not necessarily distorted by the dies, as will occur where the blank, after being punched, must be upset to fill the box and complete the nut.

I have purposely avoided a detailed description of dies, punches, die-boxes, and the general mechanism of nut-machines, for the reason that if the essentials, viz., a closed die-box and a punch increasing in size from the entering end, are attended to, then any of the well known machines may be employed.

Having thus described my invention, what I claim, and desire to secure by Letters Patent, is—

The method herein described for manufacturing nuts, consisting of the following steps: first, forming a bar of iron, the cross-section of which corresponds to, and is slightly less than, that of the nut to be produced; secondly, dividing said bar into sections of suitable size; thirdly, inclosing the blank thus formed in a close die-box; and, finally, forming the eye of the nut, while supported in the die-box, by means of a punch, which increases in size from the entering end, substantially as and for the purpose specified.

In testimony whereof I, the said JACOB SUTTER, have hereunto set my hand.

JACOB SUTTER.

Witnesses:
  T. B. KERR,
  F. W. RITTER, Jr.